(12) United States Patent
Nakanishi et al.

(10) Patent No.: US 12,483,774 B2
(45) Date of Patent: Nov. 25, 2025

(54) MOBILE WORK ANALYSIS DEVICE AND WORK ANALYSIS METHOD

(71) Applicant: BROADLEAF CO., LTD., Tokyo (JP)

(72) Inventors: Hiroaki Nakanishi, Tokyo (JP); Takahide Arao, Tokyo (JP); Makoto Nomura, Tokyo (JP); Takeo Shimoyama, Tokyo (JP)

(73) Assignee: BROADLEAF CO., LTD., Tokyo (JP)

( * ) Notice: Subject to any disclaimer, the term of this patent is extended or adjusted under 35 U.S.C. 154(b) by 34 days.

(21) Appl. No.: 18/290,532

(22) PCT Filed: May 27, 2022

(86) PCT No.: PCT/JP2022/021786
§ 371 (c)(1),
(2) Date: Nov. 14, 2023

(87) PCT Pub. No.: WO2022/255264
PCT Pub. Date: Dec. 8, 2022

(65) Prior Publication Data
US 2024/0259666 A1 Aug. 1, 2024

(30) Foreign Application Priority Data
May 31, 2021 (JP) .................. 2021-091768

(51) Int. Cl.
*G06Q 10/00* (2023.01)
*G06V 10/44* (2022.01)
(Continued)

(52) U.S. Cl.
CPC ............. *H04N 23/61* (2023.01); *G06V 10/44* (2022.01); *G06V 10/764* (2022.01); *G06V 20/52* (2022.01); *G06V 40/20* (2022.01); *H04N 23/631* (2023.01)

(58) Field of Classification Search
CPC .... G06Q 10/00; G06Q 10/0633; G06Q 10/06; G06Q 10/06398; G06V 10/44;
(Continued)

(56) References Cited

U.S. PATENT DOCUMENTS

2007/0282479 A1* 12/2007 Shibuya .................. G07C 1/10
700/111
2009/0046992 A1 2/2009 Kitagawa
(Continued)

FOREIGN PATENT DOCUMENTS

| CN | 108733027 A | 11/2018 |
|---|---|---|
| CN | 112189210 A | 1/2021 |

(Continued)

OTHER PUBLICATIONS

Office Action issued on May 24, 2023 by the Taiwanese Patent Office in corresponding TW Patent Application No. 111120249.
(Continued)

*Primary Examiner* — Daquan Zhao
(74) *Attorney, Agent, or Firm* — Sughrue Mion, PLLC

(57) ABSTRACT

A mobile work analysis device is used for work analysis based on a work moving image of a line work while recording the work moving image. The mobile work analysis device includes: a first boundary setting unit configured to receive input of a user operation and set a boundary for each work element on the work moving image; a boundary detector configured to detect recognition information associated with each work process, a boundary between a work of a first work process and a work of a second work process in the line work being recognized by the recognition information; and a second boundary setting unit configured to, when the recognition information associated with the second work process is detected, automatically set the boundary on the work moving image between the work of the first work
(Continued)

process and the work of the second work process, based on the recognition information.

7 Claims, 12 Drawing Sheets

(51) Int. Cl.
*G06V 10/764* (2022.01)
*G06V 20/52* (2022.01)
*G06V 40/20* (2022.01)
*H04N 23/61* (2023.01)
*H04N 23/63* (2023.01)
*G06Q 10/06* (2023.01)

(58) Field of Classification Search
CPC ...... G06V 10/764; G06V 20/52; G06V 40/20; G06V 10/00; G06V 10/10; G06V 10/20; G06V 10/40; G06V 10/88; H04N 23/61; H04N 23/631; H04N 23/00
USPC .................................................. 348/61, 180
See application file for complete search history.

(56) References Cited

U.S. PATENT DOCUMENTS

| | | |
|---|---|---|
| 2017/0039697 A1 | 2/2017 | Nakata et al. |
| 2018/0307203 A1 | 10/2018 | Aizawa et al. |
| 2020/0265256 A1 | 8/2020 | Ozawa et al. |
| 2021/0225029 A1 | 7/2021 | Sato |

FOREIGN PATENT DOCUMENTS

| | | |
|---|---|---|
| JP | 2002288703 A | 10/2002 |
| JP | 2006-101155 A | 4/2006 |
| JP | 2009-49574 A | 3/2009 |
| JP | 2013-211000 | 10/2013 |
| JP | 2017-10277 A | 1/2017 |
| JP | 2017-10278 A | 1/2017 |
| JP | 2020-194243 A | 12/2020 |
| JP | 2020-205027 A | 12/2020 |
| JP | 2021-47640 A | 3/2021 |
| JP | 2021-67981 A | 4/2021 |
| WO | 2015/186518 A1 | 12/2015 |

OTHER PUBLICATIONS

International Search Report (PCT/ISA/210) and Written Opinion (PCT/ISA/237) issued by the International Searching Authority on Sep. 1, 2022 in corresponding International Application No. PCT/JP2022/021786.
Office Action issued Dec. 19, 2023, issued by the Japan Patent Office in counterpart Japanese Patent Application No. 2023-152217.
Communication issued on Jul. 2, 2024 by the Japanese Patent Office for Japanese Patent Application No. 2023-152215.
Communication issued on Jul. 2, 2024 by the Japanese Patent Office for Japanese Patent Application No. 2023-152216.
Office Action dated Nov. 12, 2024, issued by Japanese Patent Office in Japanese Patent Application No. 2023-152215.
Office Action dated Nov. 12, 2024, issued by Japanese Patent Office in Japanese Patent Application No. 2023-152216.
Communication issued on Apr. 1, 2025 from the Japan Patent Office in the corresponding Japanese Patent Application No. 2023-152215.
Communication issued on Apr. 1, 2025 from the Japan Patent Office in the corresponding Japanese Patent Application No. 2023-152216.

* cited by examiner

FIG. 7

<CYCLE ANALYSIS SCREEN>

<WORK ANALYSIS>     CYCLE ANALYSIS     <PILEUP ANALYSIS> — 60

61

| No. | WORK ELEMENT NAME | AVERAGE | MAXIMUM | MINIMUM | WORK TIME ||||| TYPE |
|---|---|---|---|---|---|---|---|---|---|
| | | | | | CYCLE 1 | CYCLE 2 | CYCLE 3 | CYCLE 4 | ... |
| 1 | WORK ELEMENT 1-1 | 11.50 | 12.00 | 10.50 | 12.00 | 11.50 | 10.50 | *** | ... | VALID |
| 2 | WORK ELEMENT 1-2 | 11.00 | 12.50 | 10.50 | 11.00 | 10.50 | 12.50 | *** | ... | ** |
| 3 | WORK ELEMENT 1-3 | ** | ** | ** | 11.00 | 10.00 | 9.50 | *** | ... | ** |
| 4 | WORK ELEMENT 2-1 | ** | ** | ** | 11.00 | 11.00 | 11.50 | *** | ... | ** |
| 5 | WORK ELEMENT 2-2 | ** | ** | ** | 9.00 | 8.50 | 8.00 | *** | ... | ** |
| | TOTAL TIME | ** | ** | ** | 85.00 | 72.00 | 80.00 | *** | ... | |

FIG. 9

<WORK ELEMENT LIST DATA>

| No. | WORK ELEMENT NAME | WORK TIME ||||||| TYPE |
| --- | --- | --- | --- | --- | --- | --- | --- | --- | --- |
|  |  | AVERAGE | MAXIMUM | MINIMUM | CYCLE 1 | CYCLE 2 | CYCLE 3 | CYCLE 4 | ... |  |
| 1 | WORK ELEMENT 1-1 | 11.50 | 12.00 | 10.50 | 12.00 | 11.50 | 10.50 | *** | ... | VALID |
| 2 | WORK ELEMENT 1-2 | 11.00 | 12.50 | 10.50 | 11.00 | 10.50 | 12.50 | *** | ... | ** |
| 3 | WORK ELEMENT 1-3 | ** | ** | ** | 11.00 | 10.00 | 9.50 | *** | ... | ** |
| 4 | WORK ELEMENT 2-1 | ** | ** | ** | 11.00 | 11.00 | 11.50 | *** | ... | ** |
| 5 | WORK ELEMENT 2-2 | ** | ** | ** | 9.00 | 8.50 | 8.00 | *** | ... | ** |
|  | ... | ... | ... | ... | ... | ... | ... | ... | ... | ... |
|  | TOTAL TIME | ** | ** | ** | 85.00 | 72.00 | 80.00 | *** |  |  |

FIG. 10

<WORK-RELATED DATA>

| IDENTIFICATION ID | WORK ELEMENT NAME | WORK MOVING IMAGE | WORK POSITION | WORKER | RECOGNITION INFORMATION | WORK TIME | TYPE |
|---|---|---|---|---|---|---|---|
| 001 | WORK ELEMENT 1-1 | 001.mp4 | FIRST WORK PROCESS | BROAD ICHIRO | IDENTIFICATION MARK | — | VALID |
| 002 | WORK ELEMENT 1-2 | 002.mp4 | FIRST WORK PROCESS | BROAD ICHIRO | IDENTIFICATION MARK | — | VALID |
| 003 | WORK ELEMENT 1-3 | 003.mp4 | FIRST WORK PROCESS | BROAD ICHIRO | IDENTIFICATION MARK | — | INVALID |
| 004 | WORK ELEMENT 2-1 | 004.mp4 | SECOND WORK PROCESS | BROAD JIRO | IDENTIFICATION MARK | — | VALID |
| 005 | WORK ELEMENT 2-2 | 005.mp4 | SECOND WORK PROCESS | BROAD JIRO | IDENTIFICATION MARK | — | VALID |
| ... | ... | ... | ... | ... | ... | ... | ... |

MOBILE WORK ANALYSIS DEVICE AND WORK ANALYSIS METHOD

CROSS REFERENCE TO RELATED APPLICATIONS

This application is a National Stage of International Application No. PCT/JP2022/021786 filed on May 27, 2022 claiming priority from Japanese Patent Application No. 2021-091768 filed on May 31, 2021, the disclosures of which are incorporated herein in their entirety by reference.

TECHNICAL FIELD

The present invention relates to a mobile work analysis device and a work analysis method, and more particularly, to a mobile work analysis device and a work analysis method capable of recording a moving image of a work and performing work analysis based on the moving image of a work.

BACKGROUND ART

In related art, there are work analysis devices capable of capturing an image of a work, displaying a moving image of a work (hereinafter, referred to as a work moving image) and analyzing an operation of the work in order to "visualize" movement or time of a human, a machine, and an object so as to achieve reduction in work time, labor consumption, and costs at a production site.
In addition, among the above-described work analysis devices, there is a mobile work analysis device that is portable in order to capture an image of a work of each work process in a line work including a plurality of the work processes (for example, refer to Patent Literatures 1 and 2).

CITATION LIST

Patent Literature

Patent Literature 1: JP-A-2002-288703
Patent Literature 2: JP-A-2013-211000

SUMMARY OF INVENTION

Technical Problem

According to the mobile work analysis device as described above, a work analyst can record a work moving image and perform work analysis in real time based on the work moving image. Therefore, a burden on the work analyst is heavy and thus there is a demand for a technique that enables the work analyst to efficiently perform the work analysis.
In particular, there is a demand for a technique capable of specifying a work element for each work process and efficiently analyzing the work element in a line work including a plurality of the work processes.
The present invention has been made in view of the above problem, and an object of the present invention is to provide a mobile work analysis device and a work analysis method through which a work analyst can record a work moving image and perform work analysis based on the work moving image.

Solution to Problem

To solve the above-described problem, a first aspect of the present invention relates to a mobile work analysis device including: an image-capturing unit configured to capture an image of a work and record a work moving image that is a moving image of the work. The mobile work analysis device is configured to record the work moving image and perform work analysis based on the work moving image, and during a work that includes a plurality of work processes, the mobile work analysis device is portable in order to capture an image of a work of each of the work processes. The mobile work analysis device further includes: a first boundary setting unit configured to receive input of a user operation and set a boundary for each work element on the work moving image recorded by the image-capturing unit; a boundary detection unit configured to detect recognition information by which a boundary between a work of a first work process and a work of a second work process that is subsequent to the first work process in the work is recognized; a second boundary setting unit configured to, when the recognition information is detected, set the boundary on the work moving image between work elements that are the work of the first work process and the work of the second work process, based on the recognition information; a type designation unit configured to designate a type including at least one of a valid operation indicating that a valid operation has been performed in the work and an invalid operation indicating that an invalid operation has been performed in the work for each of the work elements defined by setting the boundary by the first boundary setting unit and the second boundary setting unit; and a storage unit configured to store the work element for which the type is designated by the type designation unit.

To solve the above-described problem, a second aspect of the present invention relates to a work analysis method executed by a mobile computer including an image-capturing unit configured to capture an image of a work and record a work moving image that is a moving image of the work, the mobile computer being configured to record the work moving image and perform work analysis based on the work moving image, and being portable during a work that includes a plurality of work processes in order to capture an image of a work of each of the work processes. The work analysis method includes: receive input of a user operation and set a boundary for each work element on the work moving image recorded by the image-capturing unit, detect recognition information by which a boundary between a work of a first work process and a work of a second work process that is subsequent to the first work process in the work is recognized, when the recognition information is detected, set the boundary on the work moving image between work elements that are the work of the first work process and the work of the second work process, based on the recognition information, designate a type including at least one of a valid operation indicating that a valid operation has been performed in the work and an invalid operation indicating that an invalid operation has been performed in the work relative to each of the work elements defined by setting the boundary, and store the work element for which the type is designated.

Effects of Invention

According to the mobile work analysis device and the work analysis method of the present invention, the work analyst can record the work moving image and perform the work analysis based on the work moving image. In addition, in the analysis of the work, it is possible to specify the work element for each work process and efficiently analyze the work element.

BRIEF DESCRIPTION OF DRAWINGS

FIG. 7 shows an example of a cycle analysis screen;
FIG. 9 shows an example of work element list data;
FIG. 10 shows an example of work-related data.

DESCRIPTION OF EMBODIMENTS

Figure 1:
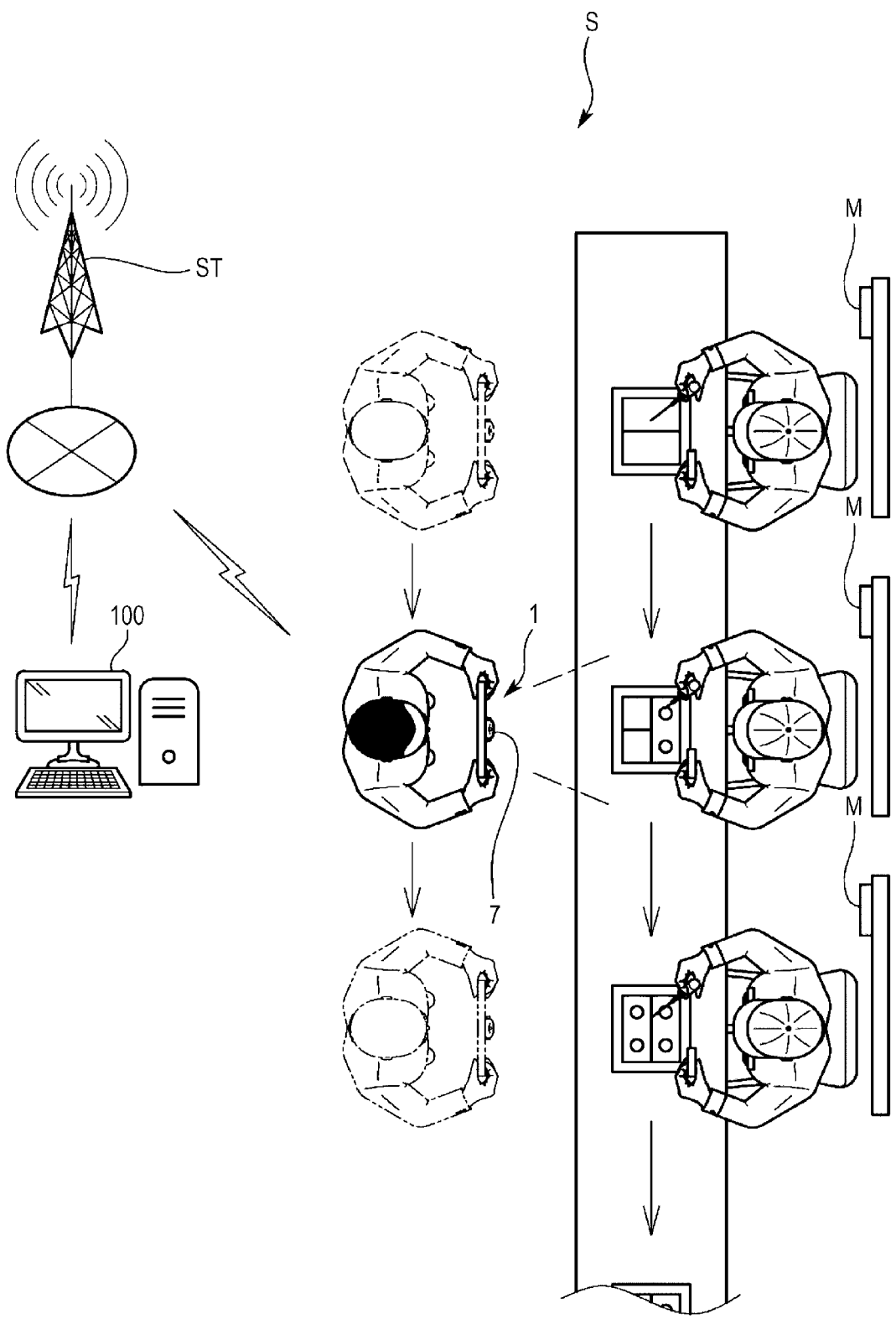
FIG. 1 is an overall configuration diagram of a work analysis system of an embodiment.

Hereinafter, an embodiment of the present invention will be described with reference to FIGS. 1 to 11.
As shown in FIG. 1, a work analysis system S of the present embodiment is mainly constituted by a mobile work analysis device 1 that is used when performing work analysis in real time while capturing an image of a work and recording a work moving image, and an external analysis device 100 that is connected to the work analysis device 1 through a network, acquires analysis data related to the work analysis from the work analysis device 1, and is used when creating work analysis (detailed analysis) or a work standard based on the analysis data.
In the present embodiment, the term "work" is a line work or a cell work that is constituted by a plurality of work processes to be performed in association with each other, and includes a work performed by a worker and a work performed by a machine such as a robot.
The term "line work" refers to an aggregate of a series of work processes, and is a work performed by a method called a line production method in which the work processes are arranged in a predetermined line shape. In addition, the term "cell work" refers to an aggregate of a series of work processes, and is a work performed by a method called a cell production method in which the work processes are arranged in a special shape such as a U shape or a two-parallel-lines shape among predetermined line shapes of the line work. Since such a cell work is one type of the line work, hereinafter, the "cell work" is also included in what is referred to as the line work.
For example, an assembly line in which a product or an assembly is assembled through respective work processes such as joining, separation, and processing may be exemplified.
The term "work process (a work of the work process)" indicates an aggregate of a series of work elements, and examples thereof include engine attachment, bumper attachment, tire attachment, and the like.
The term "work element" indicates an aggregate of a series of operations, and examples thereof include preparation of a bush, confirmation of a bush setting position, setting of the bush, and assembly to a vehicle body. The term "operation" indicates a minimum unit when the work is subdivided.

<Hardware Configuration of Work Analysis System>

Figure 2:
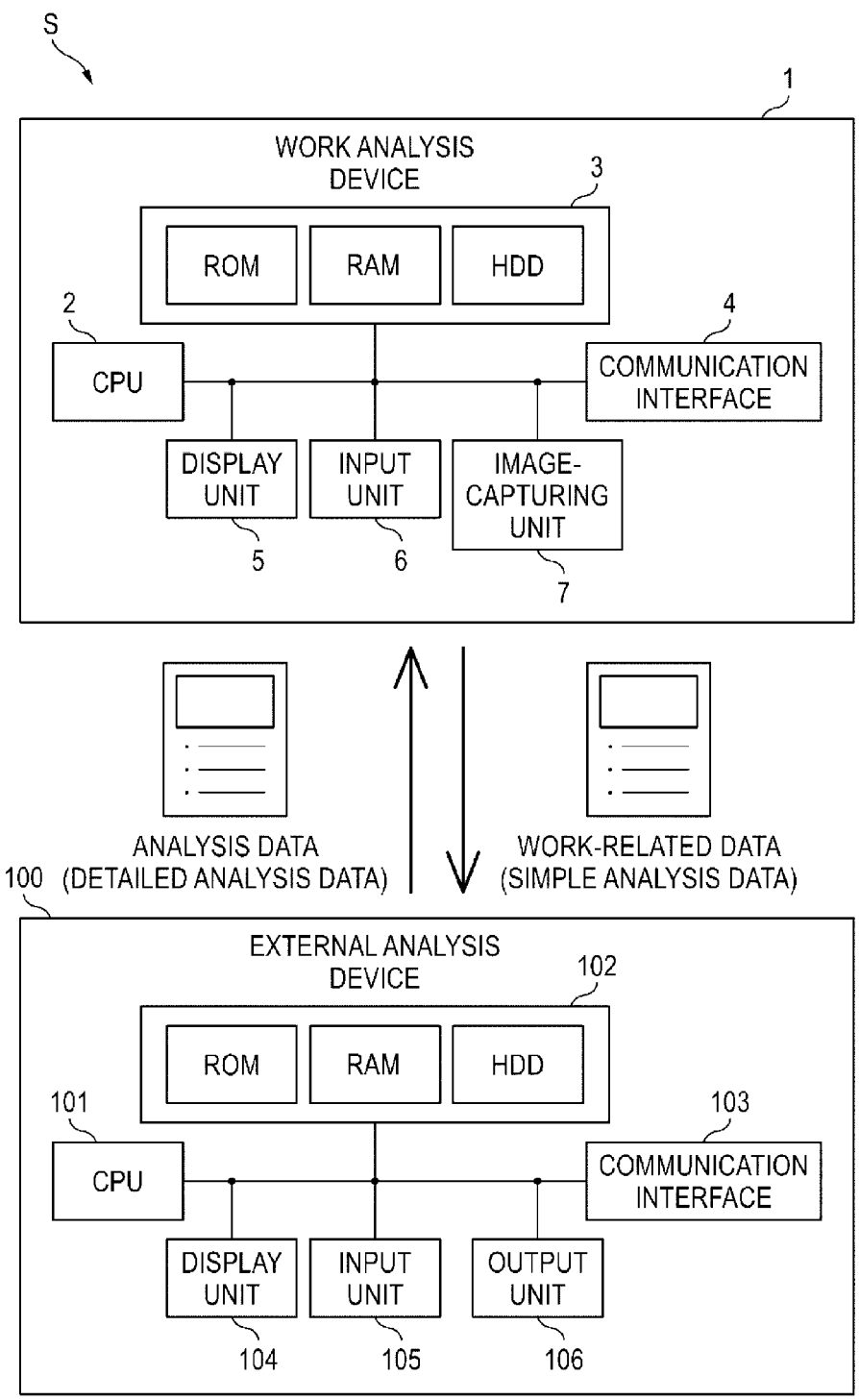
FIG. 2 shows a hardware configuration of the work analysis system.
Figure 5A:
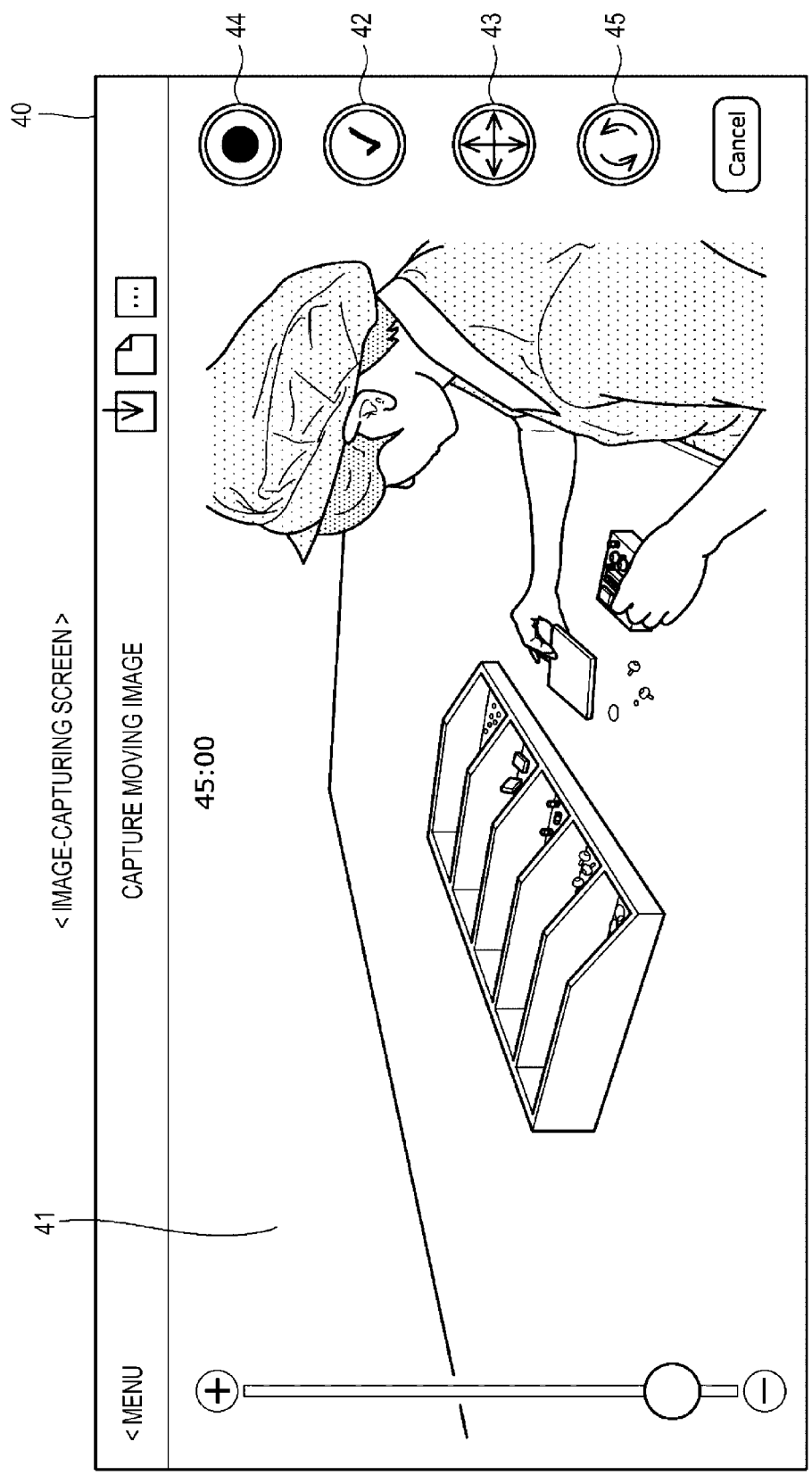
FIG. 5A shows an example of an image-capturing screen.
Figure 5B:
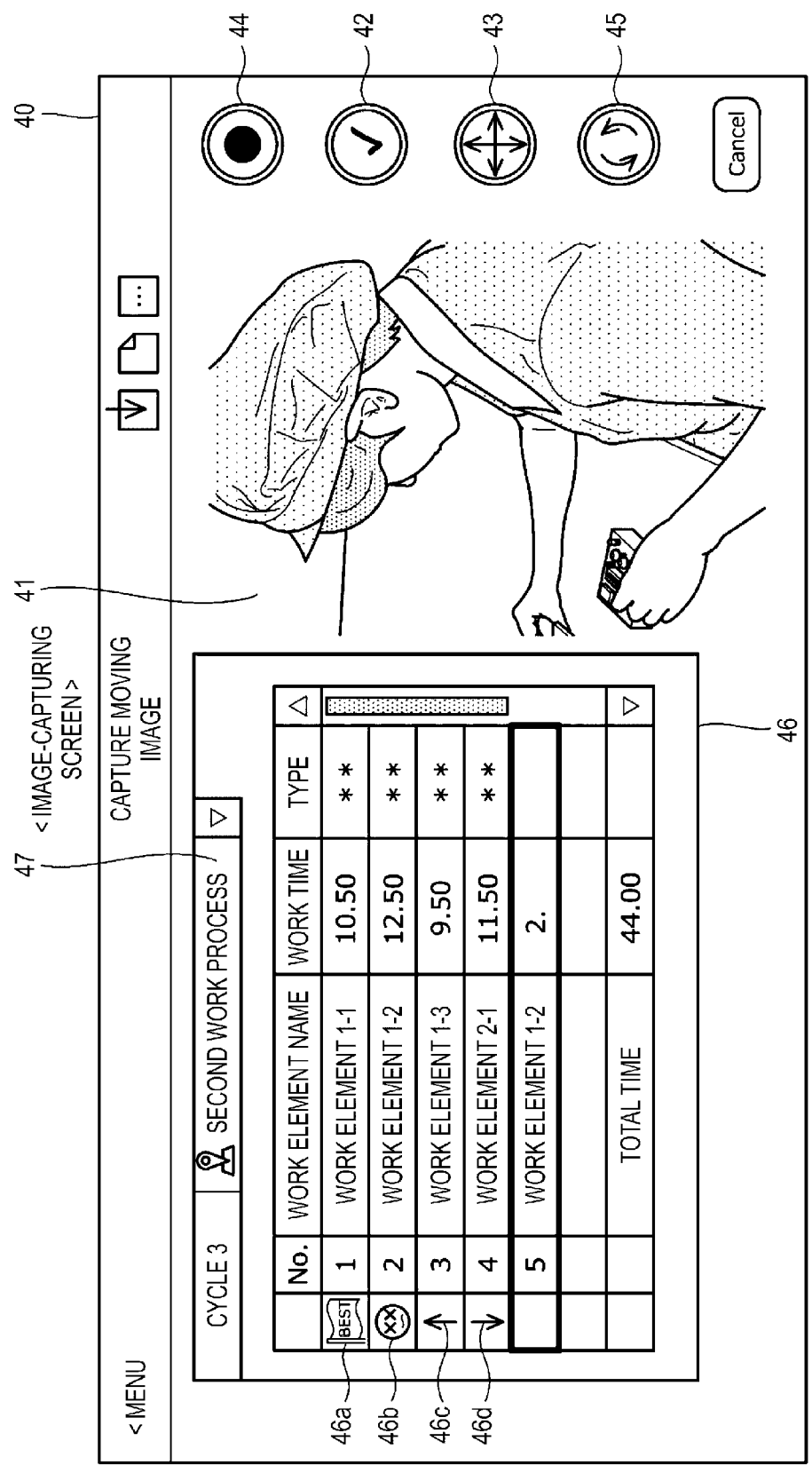
FIG. 5B shows a state in which a work element list is displayed on the image-capturing screen.
Figure 6:
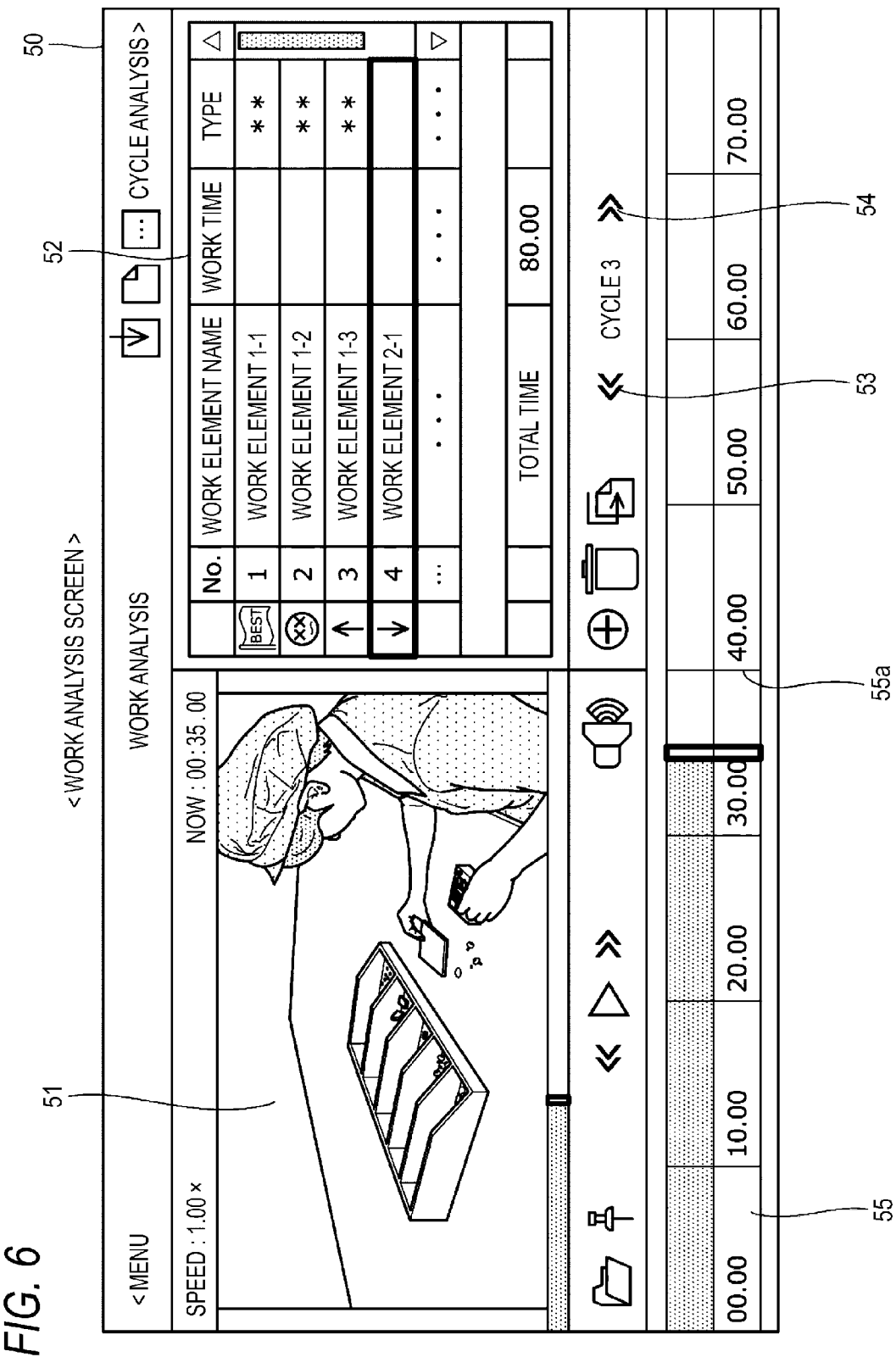
FIG. 6 shows an example of a work analysis screen.
Figure 8:
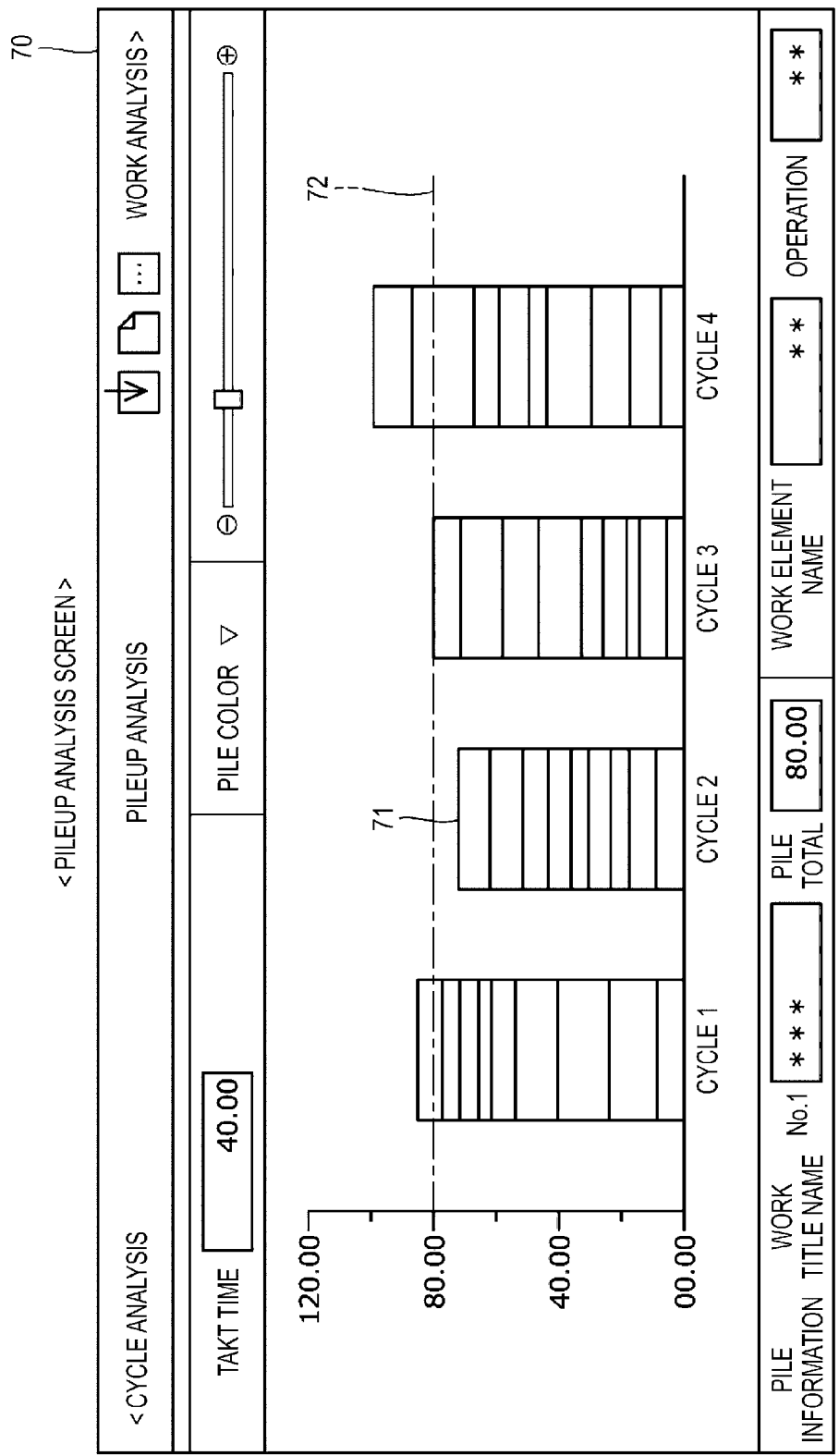
FIG. 8 shows an example of a pileup analysis screen.

As shown in FIG. 1, the work analysis device 1 is a mobile terminal that is used by an analyst who performs work analysis, and is portable in order to capture an image of a work of each work process during a line work including a plurality of the work processes.
The work analysis device 1 can perform work analysis while displaying a work moving image in real time (real-time analysis) as shown in FIGS. 5A and 5B, or can perform work analysis for each cycle while displaying a work moving image after image-capturing (work time analysis) as shown in FIG. 6.
In addition, the work analysis device 1 can also display a cycle analysis screen as shown in FIG. 7 or a pileup analysis screen as shown in FIG. 8 and then perform cycle analysis of confirming variations in works (work elements) of each cycle. The cycle at this time is constituted by one or a plurality of work processes, and is an aggregate of a series of work processes during which a certain product or assembly is assembled, which indicates a single "line work".
The work analysis and the cycle analysis performed in the work analysis device 1 are also referred to as "simple analysis" and "first work analysis".
Specifically, as shown in FIG. 2, the work analysis device 1 is a mobile computer including a CPU 2 that serves as a data calculation-and-control processing device, a storage device 3 including a ROM, a RAM, and an HDD (SSD), a communication interface 4 that transmits and receives information data through a network, a display unit 5 that displays information in terms of characters or images, an input unit 6 that is operated by a user when a predetermined command is to be input to the CPU, and an image-capturing unit 7 (specifically, an image-capturing camera) that captures an image of a work and records a work moving image.
The work analysis device 1 stores the work moving image (work moving image data) recorded by the image-capturing unit 7 in a divided manner for each cycle. In addition, the work moving image can also be stored in a divided manner for each work process.
The storage device 3 of the work analysis device 1 stores a work analysis program in addition to a main program that performs functions necessary as a computer, and functions of the work analysis device 1 are exhibited by executing the program by the CPU.
As shown in FIG. 2, the work analysis device 1 can also communicate with the external analysis device 100 via the network and transmit analysis data (strictly speaking, simple analysis data) related to work analysis. As the analysis data, specifically, "work-related data" shown in FIG. 10 is transmitted in addition to "work moving image data". Of course, analysis data after the simple analysis performed in the work analysis device 1 may also be transmitted.
As shown in FIGS. 1 and 2, the external analysis device 100 is a computer used by an external analyst, and includes a CPU 101, a storage device 102, a communication interface 103, a display unit 104, an input unit 105, and an output unit 106 that outputs information in terms of characters or images, similarly to the work analysis device 1.
The external analysis device 100 can communicate with the work analysis device 1 via the network, receive the analysis data related to the work analysis, and perform work analysis based on the analysis data. Alternatively, the external analysis device 100 can also perform real-time communication with the work analysis device 1, share the work moving image together with an analyst of a work site, and perform work analysis (real-time analysis) and assignment of a work comment related to the work based on the work moving image.

The work analysis performed in the external analysis device 100 is also referred to as "detailed analysis" or "second work analysis". The second work analysis includes the first work analysis, and is work analysis different from the first work analysis.

More specifically, as more detailed analysis contents, the external analysis device 100 receives an input of a user operation, sets a "rating rate" for each work element, and calculates a "work standard time". In addition, a "classification" or a "work type" can also be set for each work element.

The term "rating rate" refers to a numerical value for classifying or digitizing an object based on a predetermined standard. For example, the "rating rate" is an evaluation value for evaluating whether a worker displayed in the work moving image is mature, whether the worker is familiar with the work, or the like.

The term "work standard time" refers to a time required for a mature worker having suitability for the work to carry out the work at a normal work pace with a necessary spare time under predetermined work conditions. The work standard time is generally calculated by integrating the rating rate relative to a valid operation time.

The term "classification" refers to an item to be input by selecting one from classifications of "operation", "semi-operation", and "non-operation" for each work element. The term "operation" indicates a state in which a human is working, the term "semi-operation" indicates a state in which a machine is operating, and the term "non-operation" indicates a standby state in which neither a human nor a machine is operating.

The term "work type" refers to, for example, an item to be input by selecting one from classifications of "manual work", "tool work", and "machine work" for each work element.

The analysis data (strictly speaking, the detailed analysis data) generated by the external analysis device 100 is associated with information different from the simple analysis data, and is transmitted from the external analysis device 100 to the work analysis device 1 in response to a data request from the work analysis device 1. The work analysis device 1 can receive and output the detailed analysis data. As a result, when the analyst wants to confirm analysis contents that are more detailed than the first work analysis, the analyst can request the second work analysis to the outside, and can confirm a result of the second work analysis in the work analysis device 1.

This means that it is possible to perform work analysis according to importance of the work and a degree of consideration of improvement contents, and the analyst and the worker can output and confirm a work result by the work analysis device 1 through any work analysis (the first work analysis and the second work analysis).

<Functions of Work Analysis System>

Figure 3:
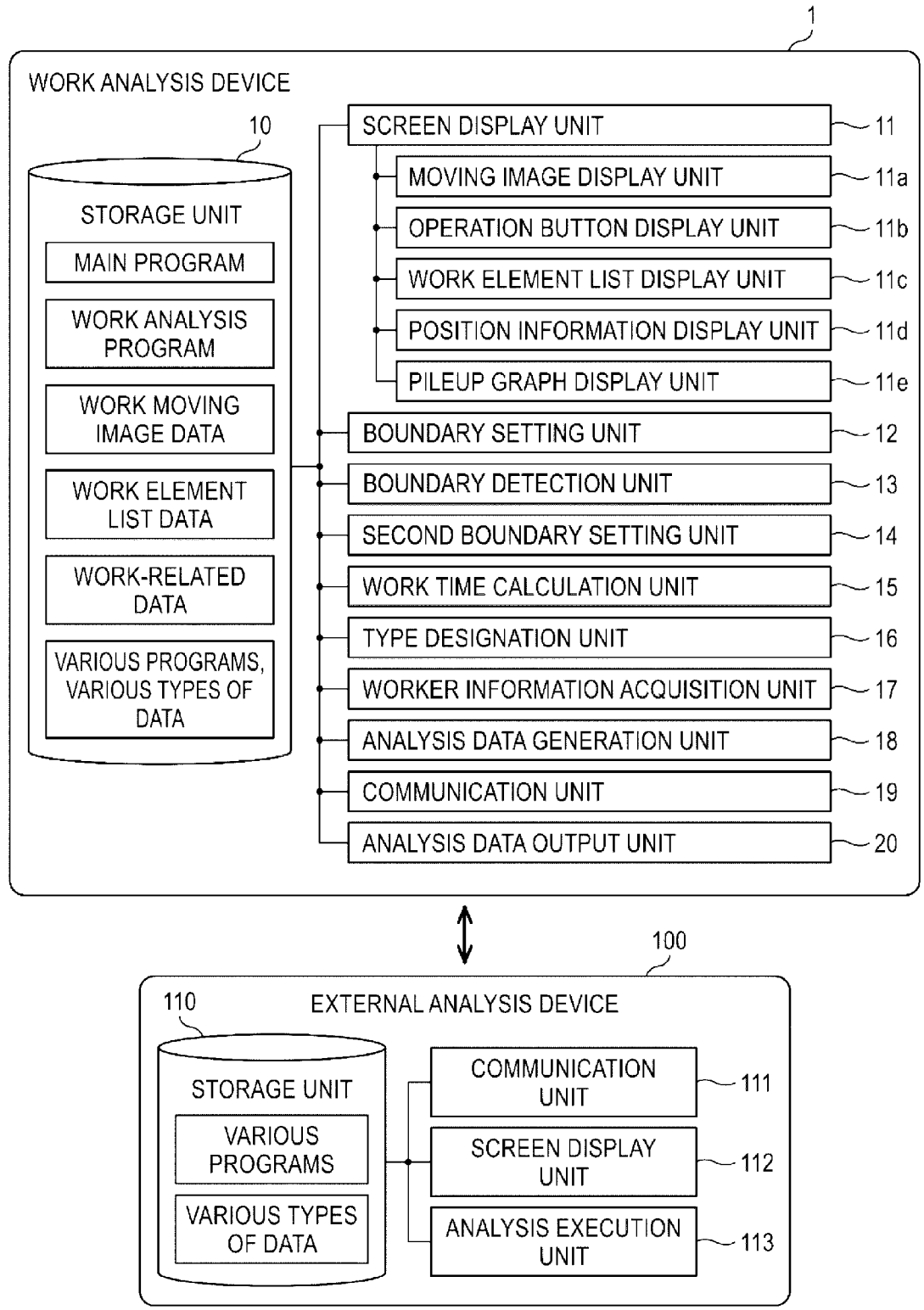
FIG. 3 shows functions of the work analysis system.

As shown in FIG. 3, when described from functional aspects, the work analysis device 1 includes, as main constituent elements, a storage unit 10 that stores various programs and various types of data such as "work moving image data", "work element list data", and "work related data", a screen display unit 11, a boundary setting unit 12, a boundary detection unit 13, a second boundary setting unit 14, a work time calculation unit 15, a type designation unit 16, a worker information acquisition unit 17, an analysis data generation unit 18, a communication unit 19, and an analysis data output unit 20.

These constituent elements are configured by a CPU, a ROM, a RAM, an HDD, a communication interface, various programs, and the like.

When the external analysis device 100 is also described from functional aspects, the external analysis device 100 includes, as main constituent elements, a storage unit 110 that stores various programs and various types of data, a communication unit 111 that transmits and receives various types of data to and from the work analysis device 1, a screen display unit 112 that displays a work analysis screen, and an analysis execution unit 113 that receives an input of a user operation and executes work analysis.

Hereinafter, the functions of the work analysis device 1 will be described in detail. Although the work analysis device 1 is configured to include the storage unit 10 in the present embodiment, the present embodiment is merely an example, and the storage unit 10 may also be implemented in an external storage device provided outside the work analysis device 1. In this case, the work analysis device 1 and the external storage device may be connected to each other via a communication path.

<<Display of Analysis Screen>>

The screen display unit 11, for example, receives the input of the user operation, executes software installed in the work analysis device 1, and displays a "menu screen" that is an initial screen when the user is logged in.

Figure 4:
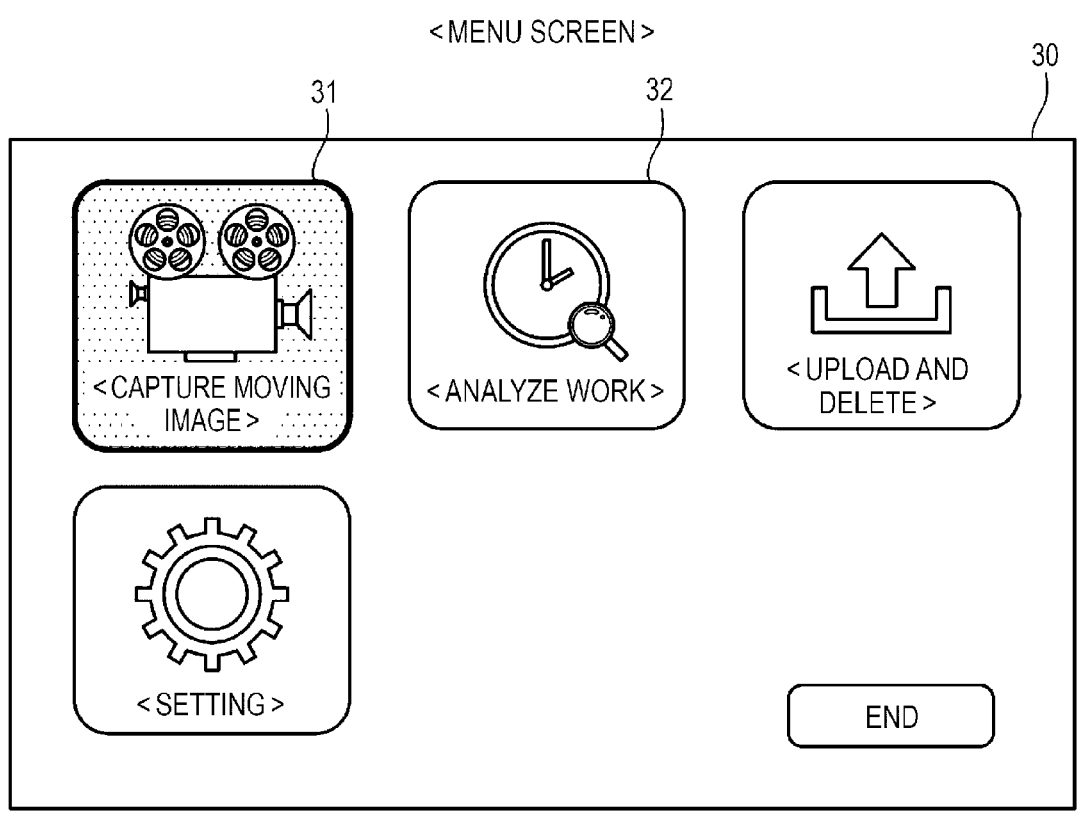
FIG. 4 shows an example of a menu screen.

Specifically, as shown in FIG. 4, the screen display unit 11 displays, as a menu screen 30, a list screen that allows the user to select a predetermined selection item from a plurality of selection items.

When the screen display unit 11 receives user selection of a selection item 31 "capture moving image" on the menu screen 30, the screen transitions to an image capturing screen 40 shown in FIG. 5A. In addition, when user selection of a selection item 32 "analyze work" is received on the menu screen 30, the screen transitions to a work analysis screen 50 shown in FIG. 6. Further, the screen can transition from the work analysis screen 50 to a cycle analysis screen 60 shown in FIG. 7 or a pileup graph screen 70 shown in FIG. 8.

The term "user operation" is assumed to be a touch panel operation performed by the user, and may also be an operation other than the touch panel operation, for example, an operation performed by voice, a gesture operation, or the like.

Here, the "image-capturing screen 40" shown in FIGS. 5A and 5B is a display screen used for recording the work moving image and performing the work analysis based on the work moving image in real time.

The "work analysis screen 50", the "cycle analysis screen 60", and the "pileup graph screen 70" are display screens used for performing the work analysis after the work moving image is recorded, and the analyst uses the display screens by switching the display screens according to purposes of the work analysis.

On the "work analysis screen 50" shown in FIG. 6, the work moving image after image-capturing can be displayed and divided into work elements for each cycle, and then calculation of a work element time, type setting, and the like can be performed. A work element list is displayed on the "cycle analysis screen 60" shown in FIG. 7 while a pileup graph is displayed on the "pileup graph screen 70" shown in FIG. 8, and then confirmation of variations in works (work elements) of each cycle, rearrangement of the work elements, and organization (recombination, replacement, rearrangement) of work processes can be performed.

The screen display unit 11 includes, as specific functional units, a moving image display unit 11a, an operation button display unit 11b, a work element list display unit 11c, a position information display unit 11d, and a pileup graph display unit 11e.

The moving image display unit 11a displays the "work moving image" obtained by capturing an image of the work on a display screen, and specifically displays a work moving image 41 in real time on the image-capturing screen 40 shown in FIGS. 5A and 5B, and displays a work moving image 51 after image-capturing on the work analysis screen 50 shown in FIG. 6.

Although the work analysis screen shown in FIG. 6 is described as an example in which the work moving image is displayed after the image-capturing in the present embodiment, when the analyst performs a predetermined screen change operation, it is also possible to display the work analysis screen temporarily instead of FIG. 5A or 5B or until a new screen change operation is performed.

The operation button display unit 11b receives a user operation, and displays, on the display screen, a "boundary setting button" configured to set a boundary for dividing the work moving image displayed in real time for each work element, and a "type designation button" configured to designate a valid operation indicating that a valid operation has been performed as work or an invalid operation indicating that an invalid operation has been performed as work relative to each work element defined by setting the boundary.

Specifically, the operation button display unit 11b displays a boundary setting button 42 and a type designation button 43 each at a position overlapping a part of the work moving image 41 on the image-capturing screen 40 shown in FIG. 5A (specifically, a right end position). In this case, each operation button is an operation button implemented by software, and an operation button constituted by hardware may also be separately provided, and the operation may also be performed by such an operation button.

In addition, the operation button display unit 11b displays, on the image-capturing screen 40, an image-capturing execution button 44 configured to execute start and stop (temporary stop) of image-capturing and a cycle switching button 45 configured to switch to image-capturing of a work of a next cycle when image-capturing of a work of one cycle is completed.

In the present embodiment, a "boundary" means a point on a boundary that is a line.

On the image-capturing screen 40, the boundary setting button 42, the type designation button 43, the image-capturing execution button 44, and the cycle switching button 45 are arranged in a line at the right end position of the display screen.

Therefore, when the analyst holds the work analysis device 1 in a hand, the analyst can easily operate the operation buttons 42 to 45 only with a thumb of a right hand, for example.

When a predetermined user operation (for example, a long press operation on the operation button) performed on the boundary setting button 42 is received, a boundary can be automatically set on the work moving image by image recognition using artificial intelligence (AI) (automatic setting is continued until released by the user operation).

In addition, when a predetermined user operation on the type designation button 43 is received, a type among "valid operation", "invalid operation", "unnecessary operation", and "verification operation" can be designated for the work element. The type at this time is information indicating, for each work element obtained by dividing the captured work moving image by setting the boundary, a result of certification of a work of the work element. That is, the type is a certification result certified in the work analysis performed in real time by the analyst.

The term "valid operation" and the term "invalid operation" at this time indicate the operation as described above. In addition, the term "unnecessary operation" refers to an operation that is valid as a work, but is an operation that is recognized as "unnecessary" as an analysis result (an operation different from the invalid operation). Further, the term "verification operation" refers to an operation that cannot be recognized as the "valid operation" or the "invalid operation" and that is recognized to require further verification. The work element for which the "verification operation" is set as the type can be changed to the "valid operation", the "invalid operation", and the "unnecessary operation" on the work analysis screen as shown in FIG. 6.

The "valid operation" can be designated when an upward drag operation on the operation button is received, the "invalid operation" can be designated when a downward drag operation is received, the "unnecessary operation" can be designated when a leftward drag operation is received, and the "verification operation" can be designated when a rightward drag operation is received.

The work element list display unit 11c displays, on the display screen, the "work element list data" including information on a work time of each defined work element and information on a total time obtained by totaling the work time of each work element.

Here, as shown in FIG. 9, the "work element list data" is a data table indicating detailed information of each work element in the work (the line work), and is created and updated by receiving an input of a user operation or the like (may be an automatic input).

Specifically, the "work element list data" includes "work time information" in which at least an identification number (No.) for identify the work element, a work element name, a work time, and a type are associated with each other, and "total time information" of all work elements, and is stored in the storage unit 10.

In addition, the work time includes information on an average work time of all cycles, a maximum work time, a minimum work time, and a work time of each cycle.

Referring to the "work element list data" shown in FIG. 9, it can be seen that a work time "10.50 (seconds)" of a cycle 3 is the best lap (a minimum time) and a work time "12.00 seconds" of a cycle 1 is the worst lap (a maximum time) under an identification number "1" and a work element name "work element 1-1". In addition, it can be seen that a type thereof is "valid (the valid operation)".

It should be noted that the cycle 3 means a third cycle while the cycle 1 means a first cycle.

As shown in FIGS. 5A and 5B, the work element list display unit 11c pops up and displays a work element list 46 at a position overlapping a part of the work moving image 41 on the image-capturing screen 40. Then an input of a user operation or the like is received, and information on the work element and information on the work time (the total time) in the work element list 46 are updated.

Along with the update of the information of the work element list 46, the information of the "work element list data" is also updated and stored in the storage unit 10.

In the work element list 46, in addition to the information on the identification number (No.), the work element name, the work time, and the type, information on a cycle of the work whose image is currently being captured and a total time of the work is displayed.

In addition, indication marks 46*a* and 46*b* indicating that the work time is the best lap or the worst lap in all the cycles, and indication marks 46*c* and 46*d* indicating that the work time is earlier or later than that of a previous cycle are given to predetermined work elements.

An indication mark indicating that an error is the smallest and an error is the largest in comparison with a preset reference time may also be given to each predetermined work.

By doing so, analysis of a good work, a bad work, and the like can be performed at the work site, and thus the worker can immediately make an improvement proposal of the work. In addition, organization (recombination, replacement, and rearrangement) of the work elements can also be proposed.

Referring to the work element list 46 shown in FIG. 5B, it can be seen that the work time "10.50 (seconds)" of the cycle 3 under the identification number "1" and the work element name "work element 1-1" is the best lap, and a work time "12.50 (seconds)" of the cycle 3 under an identification number "2" and a work element name "work element 1-2" is the worst lap (see the indication marks 46*a* and 46*b*).

In addition, it can be seen that a work time "9.50 (seconds)" of the cycle 3 under an identification number "3" and a work element name "work element 1-3" is earlier than a work time of a cycle 2 (see the indication mark 46*c*).

Although the work time and the total time of the work element list 46 are numerically displayed in the present embodiment, the present embodiment is merely an example, and a graph display or an illustration display may also be used.

In addition, the work element list display unit 11*c* can display a work element list 52 in a display region different from a display region (a display window) in which the work moving image 51 is displayed on the work analysis screen 50 shown in FIG. 6, and can display a work element list 61 over an entire display region on the cycle analysis screen 60 shown in FIG. 7.

In the work element list 52 of the work analysis screen 50 shown in FIG. 6, information on the identification number (No.), the work element name, the work time, the type, the total time, and the cycle is displayed. When cycle switching buttons 53 and 54 are operated by the user, a cycle to be analyzed can be switched (the "cycle 3" can be switched to another cycle).

In the work element list 61 of the cycle analysis screen 60 shown in FIG. 7, information on the identification number (No.), the work element name, the average work time of all cycles, the maximum work time, the minimum work time, the work time of each cycle, and the type is included, while information on the total time of the work element is also included.

It is preferable that cycles of the best lap and the worst lap among all the cycles are displayed in different display modes.

The position information display unit 11*d* displays, on the display screen, "position information" on a work place (a work place of a work process) whose image is currently being captured. The position information is position information detected by the boundary detection unit 13, and is position information calculated by detecting an identification mark M provided at the work place of each work process or by receiving a GNSS signal from an external base station ST.

Specifically, as shown in FIG. 5B, the position information display unit 11*d* can display position information 47 at a position overlapping a part of the work moving image 41 on the image-capturing screen 40.

In the position information 47, a work place "second work process" whose image is currently being captured is displayed. Therefore, it is possible to specify a current image-captured place is the work place of which work process in the line work. In the present embodiment, it is possible to specify that the work (the work elements) whose image is being captured is a work (work elements) of a "second work process".

The position information 47 is not limited to be a name of a work process, and may also be a name of a work place associated with each work process or geographical information (geographical coordinates).

The pileup graph display unit 11*e* displays a graph in which a horizontal axis represents a cycle while a vertical axis represents a work time, which is a pileup graph in which work elements are sequentially piled up for each cycle so as to form a bar graph.

Specifically, the pileup graph display unit 11*e* displays, on the pileup graph screen 70 shown in FIG. 8, a pileup graph 71 in which work elements are piled up and a time line 72 indicating a work takt time set by the user.

On the pileup graph screen 70, the analyst can compare the pileup graphs 71 of the respective cycles and level works (work elements) of the respective cycles in accordance with the time line 72.

When analyzing the line work, the pileup graph display unit 11*e* can also display a graph in which the horizontal axis represents a work process while the vertical axis represents a work time, which is a pileup graph in which work elements are sequentially piled up for each work process. By using the pileup graph, the analyst can organize the work processes.

<<Boundary Setting of Work Element>>

The boundary setting unit 12 receives an input of a predetermined user operation, and sets a boundary for each work element on the work moving image.

Specifically, the boundary setting unit 12 receives a pressing operation on the boundary setting button 42 performed by the user on the image-capturing screen 40 shown in FIG. 5A, and sets the boundary on the work moving image 41 being captured. By setting the boundary, the work whose image is being captured is divided for each work element (new work elements are added).

In addition, the boundary setting unit 12 can also receive an operation of tapping the work moving image 51 by the user on the work analysis screen 50 shown in FIG. 6 and set a boundary on the work moving image 51 after image-capturing. By setting the boundary, a work after image-capturing is divided for each work element.

As described above, the boundary setting unit 12 can set the boundary in real time on the work moving image 41 being captured so as to divide the work into the work elements, and can similarly set the boundary on the work moving image 51 after image-capturing so as to divide the work into the work elements.

At a predetermined position (a lower end position) of the work analysis screen 50, a seek bar 55 indicating a reproduction time point of the work moving image 51 being reproduced is displayed. A boundary 55*a* set by the boundary setting unit 12 is provided on the seek bar 55. At this time, by receiving a drag operation performed on the predetermined boundary 55*a* by the user, a position of the boundary 55*a* can be finely adjusted (a work time of a predetermined work element can be finely adjusted).

The boundary detection unit 13 detects "recognition information" for recognizing work processes in order to recognize a boundary between a work of a first work process and a work of a second work process subsequent to the first work process in the line work. The "recognition information" may be associated with each work process, and in this case, it is possible to identify the work process defined by the boundary. Although a case where the recognition information associated with each work process is detected will be described below, the present invention is not limited thereto. When the "recognition information" associated with the second work process is detected, the second boundary setting unit 14 sets the boundary between the work (work elements) of the first work process and the work (work elements) of the second work process on the work moving image based on the recognition information.

In the present embodiment, the "recognition information" corresponds to the "identification mark M" shown in FIG. 1 provided at a work position for each work process or the "position information" calculated by receiving the GNSS signal from the external base station ST shown in FIG. 1. Of course, the recognition information is not limited to be the identification mark or the position information, and a "work device", a "beacon", or the like that is a target to be identified may also be adopted as the recognition information.

Specifically, the boundary detection unit 13 (also referred to as a mark detection unit) detects, as the "recognition information", the "identification mark M" provided at the work position for each work process through the work moving image, as shown in FIG. 1.

Then, for example, when the identification mark M provided at a work position of the second work process is detected, the second boundary setting unit 14 automatically sets the boundary on the work moving image based on the identification mark M.

In other words, the second boundary setting unit 14 automatically sets a start time point of the work (the work elements) of the second work process with reference to a time point at which the identification mark M in the second work process is detected.

In addition, the second boundary setting unit 14 can also automatically set an end time point of the work (the work elements) of the second work process with reference to a time point at which the identification mark M in the second work process is no longer detected.

By doing so, a start time point (an end time point) and a start position (an end position) of a work (work elements) of each work process can be automatically set, and thus start time points and start positions can be accurately aligned (unified) between the cycles. As a result, the work analysis can be efficiently performed in real-time.

Alternatively, the boundary detection unit 13 (also referred to as a position information detection unit) receives the GNSS signal from the external base station ST shown in FIG. 1 as the "recognition information" so as to detect the "position information" of the work position for each work process.

Then, when position information of the work position of the second work process is detected, the second boundary setting unit 14 automatically sets the boundary on the work moving image based on the position information.

In other words, the second boundary setting unit 14 automatically sets the start time point of the work (the work elements) of the second work process with reference to a time point at which the position information of the work position of the second work process is detected.

In addition, the second boundary setting unit 14 can also automatically set the end time point of the work (the work elements) of the second work process with reference to a time point at which the position information of the work position of the second work process is no longer detected. The second boundary setting unit 14 defines the first work process and the second work process by setting the boundary based on the recognition information, in other words, defines the work of the first work process and the work of the second work process, and more specifically, defines a last work element of the first work process and a first work element of the second work process.

With the above method as well, the work analysis can be efficiently performed in real-time.

In the above configuration, the boundary detection unit 13 detects both the "identification mark M" and the "position information" as the "recognition information".

At this time, only one of the "identification mark M" and the "position information" may be detected depending on a size of the work place or a communication status. That is, it may be configured such that only the recognition information is detected with high detection accuracy.

Alternatively, the "identification mark M" may be prioritized, and the boundary may be automatically set when the "identification mark M" is detected, and the boundary may be automatically set based on the "position information" when the "identification mark M" is not detected for a certain period of time. Alternatively, the "position information" may also be prioritized.

Other "recognition information" may also be detected by the boundary detection unit 13.

In the above configuration, the boundary set by the boundary setting unit 12 and the boundary automatically set by the second boundary setting unit 14 may be distinguished by different display modes. Alternatively, the boundary set by the boundary setting unit 12 and the boundary set by the second boundary setting unit 14 may be stored in association with different types (for example, manual setting of boundaries and automatic setting of boundaries).

Further, among boundaries set by the second boundary setting unit 14, a boundary based on the "identification mark M" and a boundary based on the "position information" may be associated with different types (for example, automatically set boundary line 1 and automatically set boundary line 2).

As a result, it is possible to easily identify whether setting of a boundary is performed by a user operation or the setting of the boundary is automatically performed based on the "recognition information", and thus the work analysis is facilitated.

<<Analysis of Work Element>>

The work time calculation unit 15 calculates the work time of the work (the work elements) of the work process based on the work moving image on which the boundary is set. Specifically, the work time calculation unit 15 calculates the work time of each work element when the boundary is set on the work moving image 41 on the image-capturing screen 40 shown in FIG. 5B and the work moving image 41 is divided for each work element. In addition, a total time of the work elements is calculated with reference to a start time point of the work.

The work time (the total time) of the work elements is also calculated in the same manner on the work analysis screen 50 shown in FIG. 6.

The type designation unit 16 receives an input of a user operation based on the work moving image while recording the work moving image, and designates the type, such as the "valid operation", the "invalid operation", the "unnecessary operation", and the "verification operation" for each defined work element.

Specifically, the type designation unit 16 receives a drag operation performed on the type designation button 43 by the user on the image-capturing screen 40 shown in FIG. 5B, and designates the type for each work element.

In addition, the type designation unit 16 can also designate the type for each work element by receiving an input of a predetermined user operation on the work analysis screen 50 shown in FIG. 6 or the cycle analysis screen 60 shown in FIG. 7.

The worker information acquisition unit 17 acquires "worker attribute information" of the work (the work elements) of the work process based on the work moving image on which the boundary is set.

Here, the "worker attribute information (data)" is information in which at least a worker ID, a worker name, sex, age, the number of years of experience, and skill of the worker are associated with a predetermined work (work elements), and is stored in the storage unit 10.

Specifically, the worker information acquisition unit 17 receives an input of a user operation, and generates the "worker attribute information" for each work process or work (work elements).

Alternatively, the worker information acquisition unit 17 may generate the "worker attribute information" for each work process or work (work elements) by performing image recognition (face recognition) of the worker through the work moving image and extracting a matching worker from registered workers registered in advance.

The analysis data generation unit 18 generates "work-related information (work-related data)" as an example of the "simple analysis data" analyzed by the work analysis device 1.

As shown in FIG. 10, the "work-related data" is a data table indicating an analysis result of each work element in the line work, which is created and updated by receiving an input of a user operation or the like (may be an automatic input) and is stored in the storage unit 10 (also referred to as a work-related storage unit).

Specifically, the "work-related data" is data in which at least the identification ID, the work moving image, the information on the work place, the attribute information of the worker, the recognition information detected by the boundary detection unit 13, the information on the work time, and the information on the type are associated with each other for each work (each work element).

Although details of the information on the work time are omitted, information on the work time of each cycle, the average work time, the maximum work time, the minimum work time, and the total time is also included as in the "work element list information" shown in FIG. 9.

Referring to the "work-related data" shown in FIG. 10, it can be seen that a work moving image "001.mp4", a work place "first work process", a worker "Broad Ichiro", recognition information "identification mark", a work time "-", and a type "valid (valid operation)" are included under an identification ID "001" and a work element name "work element 1-1".

The communication unit 19 performs data communication with the outside via the network.

Specifically, the communication unit 19 communicates with the external analysis device 100 via the network, and transmits the "work-related data" as the simple analysis data related to the work analysis.

The external analysis device 100 that receives the "work-related data" performs work analysis (detailed analysis) based on the data, and generates the "detailed analysis data". It should be noted that "work standard data" indicating contents of a work standard may also be generated.

In addition, the external analysis device 100 may generate the detailed analysis data through using data in which at least the work moving image and the information on the type are associated with each other, which is a part of the work-related data, instead of generating the detailed analysis data through using the work-related data.

The communication unit 19 communicates with the external analysis device 100 again and receives the "detailed analysis data".

The analysis data output unit 20 outputs the "detailed analysis data".

Specifically, the analysis data output unit 20 outputs and displays the "detailed analysis data" on the display screen of the work analysis device 1 in order to present contents of the "detailed analysis data" to the analyst or the worker.

The "detailed analysis data" may also be output and printed through using an external printing device.

With the above configuration, it is possible to achieve the work analysis device 1 that is capable of specifying the work element for each work process and efficiently analyzing the work element while the analyst records the work moving image during the analysis of the line work.

In addition, by using the work analysis device 1, the analyst can immediately provide improvement guidance (feedback) of the work to the worker.

<Work Analysis Method>

Next, a process of the work analysis program (a work analysis method) executed by the work analysis device 1 will be described with reference to FIG. 11.

The program according to the present embodiment is a program configured to implement the screen display unit 11, the boundary setting unit 12, the boundary detection unit 13, the second boundary setting unit 14, the work time calculation unit 15, the type designation unit 16, the worker information acquisition unit 17, the analysis data generation unit 18, the communication unit 19, and the analysis data output unit 20 as functional constituent elements of the work analysis device 1 including the storage unit 10, and the CPU of the work analysis device 1 executes the work analysis program.

The storage unit 10 of the work analysis device 1 mainly stores the "work moving image data", the "work element list data", "the work-related data", and "work history data".

Figure 11:
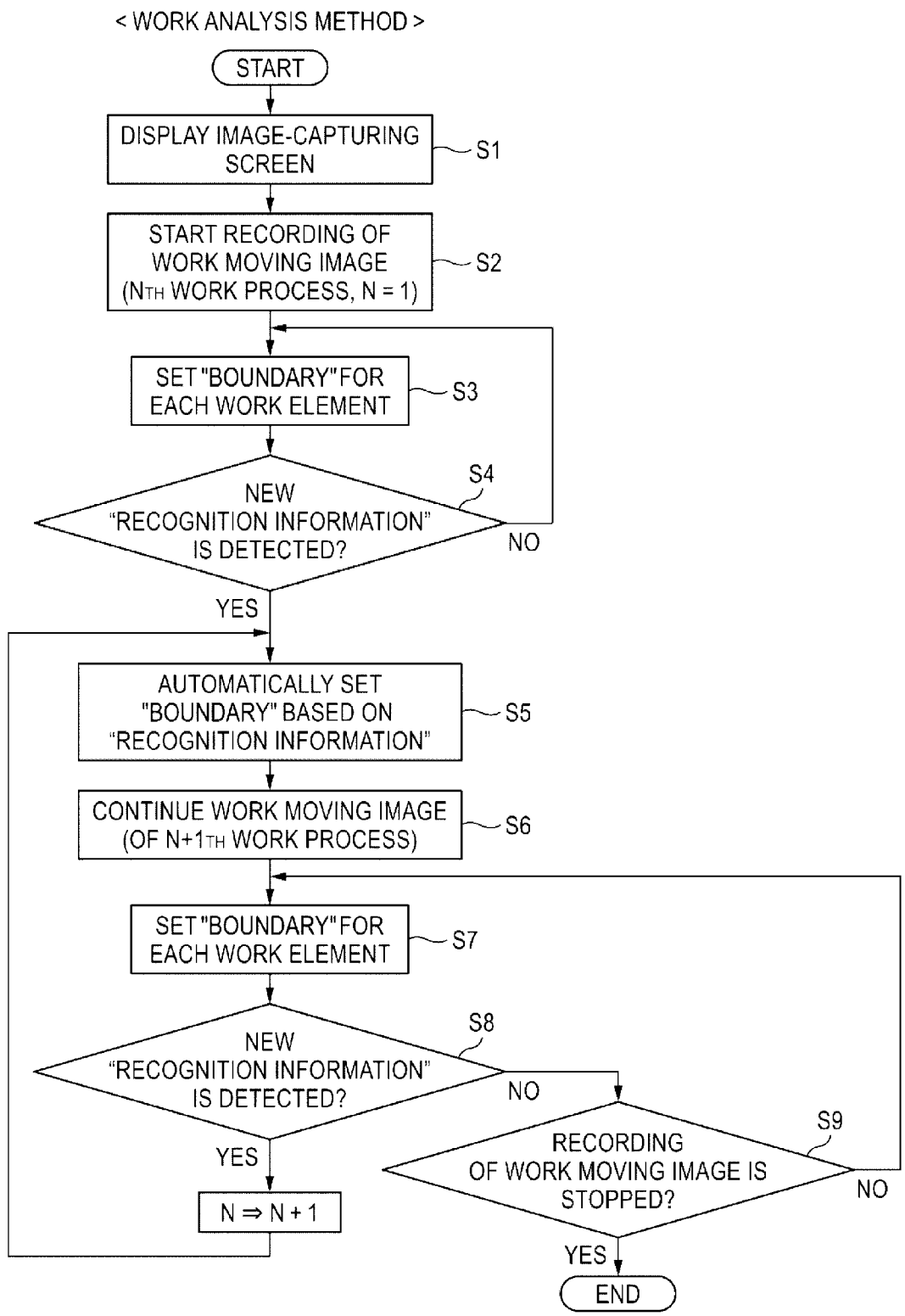
FIG. 11 is a process flow diagram showing an example of a work analysis method.

A flow shown in FIG. 11 shows a part of a processing flow of the "work analysis method". Specifically, a processing flow of a method of recording the work moving image and performing the work analysis based on the work moving image in real time is shown.

In the processing flow of the work analysis method shown in FIG. 11, first, the screen display unit 11 receives user selection of the selection item 31 "capture moving image" on the menu screen 30 shown in FIG. 4, and starts from step S1 of displaying the image-capturing screen 40 shown in FIGS. 5A and 5B.

The work analysis device 1 receives an input of a user operation, executes a dedicated web application (the work analysis program), and firstly displays the "menu screen" when the user is logged in.

Next, in step S2, the work analysis device 1 (the image-capturing unit 7) receives selection of a predetermined user operation, and starts image-capturing of the line work (starts recording of the work moving image).

Specifically, the work analysis device 1 receives an operation performed on the image-capturing execution button 44 by the user on the image-capturing screen 40 shown in FIGS. 5A and 5B, and starts image-capturing of the work of the first work process of the line work.

At this time, the boundary detection unit 13 detects the "recognition information" associated with each work process. The "recognition information" may be the "identification mark M" provided at the work position of each work process, or may be the "position information" of the work position of each work process.

In addition, the worker information acquisition unit 17 acquires the "worker attribute information" of the work (the work elements) of the work process through the work moving image. At this time, the "worker attribute information" may be generated by receiving an input of a user operation, or may be automatically generated by image recognition.

Next, in step S3, the boundary setting unit 12 receives an input of a predetermined user operation, and sets the "boundary" for each work element on the work moving image.

Specifically, an operation performed on the boundary setting button 42 by the user is received on the image-capturing screen 40 shown in FIGS. 5A and 5B, and the "boundary" is set on the work moving image 41 being captured. By setting the "boundary", new work elements are added.

At this time, the work time calculation unit 15 automatically calculates the work time of each work element when the boundary is set on the work moving image 41 on the image-capturing screen 40 and the work moving image 41 is divided for each work element. In addition, the total time of the work elements is calculated based on the start time point of the work.

The analyst can confirm the information on the work time calculated through the work element list 46 shown in FIG. 5B.

Next, in step S4, the work analysis device 1 (also referred to as a detection determination unit) determines whether the boundary detection unit 13 has detected new "recognition information".

The new "recognition information" corresponds to the "recognition information" associated with the second work process subsequent to the first work process.

When it is determined that the new "recognition information" is detected (step S4: Yes), the process proceeds to step S5. On the other hand, when it is determined that the new "recognition information" is not detected (step S4: No), the process returns to step S3.

Next, in step S5, the second boundary setting unit 14 automatically sets the "boundary" between the work of the first work process and the work of the second work process on the work moving image based on the "recognition information" associated with the second work process.

Specifically, with reference to a time point at which the "recognition information" associated with the second work process is detected, the start time point (the boundary) of the work of the second work process is automatically set on the work moving image.

Next, in step S6, the work analysis device 1 (the image-capturing unit 7) continuously performs image-capturing of the work of the second work process of the line work (continuously records the work moving image).

Then, in step S7, similarly to step S3, the boundary setting unit 12 receives the input of the predetermined user operation, and sets the "boundary" for each work element on the work moving image.

Next, in step S8, the work analysis device 1 (also referred to as the detection determination unit) determines whether the boundary detection unit 13 has detected new "recognition information".

The new "recognition information" corresponds to "recognition information" associated with a third work process subsequent to the second work process.

When it is determined that the new "recognition information" is detected (step S8: Yes), the process returns to step S5, and steps S5 to S8 are repeated for the third work process. This process is repeated until a final work process. On the other hand, when it is determined that the new "recognition information" is not detected (step S8: No), the process proceeds to step S9.

Finally, in step S9, when the work analysis device 1 receives stop of the recording of the work moving image performed by a user operation (step S9: Yes), the process of FIG. 11 is ended.

On the other hand, when the work analysis device 1 continues to record the work moving image (step S9: No), the process returns to step S7.

According to the configuration of the work analysis program described above, the analyst can record the work moving image, specify the work element for each work process, and efficiently analyze the work element during the analysis of the line work.

The "simple analysis data" generated by the execution of the work analysis program is transmitted from the work analysis device 1 to the external analysis device 100 in response to a request of a user operation.

The external analysis device 100 executes the detailed work analysis based on the "simple analysis data", generates the "detailed analysis data", and transmits the "detailed analysis data" to the work analysis device 1.

The work analysis device 1 receives the "detailed analysis data" and outputs the "detailed analysis data". In a case where the work does not need the detailed analysis data, the "simple analysis data" may be output directly.

Other Embodiments

Although the work analysis device 1 is used for the work analysis of the line work in the above embodiment as shown in FIG. 1, the work analysis device 1 may also be used for work analysis of a work other than the line work.

Although the work analysis device 1 is a mobile terminal and includes the display unit 5 and the image-capturing unit 7 in the above embodiment as shown in FIG. 2, the display unit 5 does not necessarily have to be included.

That is, the work analysis device 1 is not limited to include the "display unit (display)", the "image-capturing unit (image-capturing camera)", and the "analysis function".

For example, the work analysis device 1 may be a mobile terminal including the image-capturing unit and the analysis function, and the external analysis device that communicates with the work analysis device 1 via the network may have a system configuration that includes a "display device" for displaying the work moving image.

Although the work analysis device 1 can switch and display the work analysis screen 50, the cycle analysis screen 60, and the pileup graph screen 70, and can execute the work analysis from various viewpoints in the above embodiment as shown in FIGS. 6 to 9, the display screens are not limited to be such display screens.

For example, a "work comparison screen" that simultaneously displays a plurality of work moving images may be displayed, and "work comparison analysis" that compares work moving images of different cycles or workers may be executed.

In the above embodiment, the dedicated web application is activated through using the work analysis device 1 (the mobile terminal), and the work analysis program is executed on a web browser.

In addition, the work analysis program may be stored in a recording medium readable by the work analysis device 1, and the work analysis device 1 may read and execute the program so as to execute the process. The recording medium corresponds to, for example, a magnetic disk, a magneto-optical disk, a CD-ROM, a DVD-ROM, a semiconductor memory, or the like.

In the above embodiment, the work analysis device and the work analysis method according to the present invention have been mainly described.

However, the above embodiment is merely an example for facilitating understanding of the present invention, and does not limit the present invention. The present invention can be modified and improved without departing from the gist thereof, and it is a matter of course that equivalents thereof are included in the present invention.

As described above, the mobile work analysis device 1 can detect the recognition information for recognizing the boundary between the work of the first work process and the work of the second work process during analysis of the work (a line work), and set (automatically set) the boundary when the recognition information is detected.

Therefore, the work analyst can record the work moving image and efficiently perform the work analysis.

The invention claimed is:

1. A mobile work analysis device comprising:
an image-capturing unit configured to capture an image of a work and record a work moving image that is a moving image of the work,
wherein the mobile work analysis device is configured to record the work moving image and perform work analysis based on the work moving image, and
during a work that includes a plurality of work processes, the mobile work analysis device is portable in order to capture an image of a work of each of the work processes,
the mobile work analysis device further comprising:
at least one processor configured to
receive input of a user operation and set a temporal boundary for each work element on the work moving image recorded by the image-capturing unit;
detect recognition information by which the temporal boundary between a work of a first work process and a work of a second work process that is subsequent to the first work process in the work is recognized, the recognition information being provided on a work place of each work process;
when the recognition information is detected, set the temporal boundary on the work moving image between work elements that are the work of the first work process and the work of the second work process, based on the recognition information;
designate a type including at least one of a valid operation indicating that a valid operation has been performed in the work and an invalid operation indicating that an invalid operation has been performed in the work for each of the work elements defined by setting the temporal boundary by the first boundary setting unit and the second boundary setting unit;
calculate a work time of the work of the work process and/or the work element based on the work moving image on which the boundary is set;
acquire attribute information of a worker of the work of the work process and/or the work element based on the work moving image on which the boundary is set; and
store work-related data in which at least the work moving image of the work and/or the work element, the work time, the attribute information of the worker, and the recognition information detected by the boundary detection unit are associated with each other for each work of the work process and/or each work element; and
a storage unit configured to store the work element for which the type is designated by the type designation unit.

2. The mobile work analysis device according to claim 1, further comprising:
a communication unit configured to perform data communication with an outside via a network, transmit the work-related data to an external analysis device that performs work analysis, and receive analysis data based on the work-related data from the external analysis device; and
an analysis data output unit configured to output the analysis data.

3. The mobile work analysis device according to claim 1, further comprising:
a moving image display unit configured to display the work moving image on a display screen in real time; and
a work element list display unit configured to display work element list information on the display screen, the work element list information including information on the work time of each of the work elements defined by the first boundary setting unit and information on a total time obtained by totaling the work time of each of the work elements,
wherein the work element list display unit is configured to display the work element list information at a position overlapping a part of the work moving image displayed on the display screen.

4. The mobile work analysis device according to claim 1, further comprising:
a moving image display unit configured to display the work moving image on a display screen in real time; and
an operation button display unit configured to receive a user operation and display, on the display screen, a boundary setting button for setting the boundary for each of the work elements on the work moving image in real time and a type designation button for designating, for each of the defined work elements, a valid operation indicating that a valid operation has been performed or an invalid operation indicating that an invalid operation has been performed,
wherein the operation button display unit displays the boundary setting button and the type designation button each at a position overlapping a part of the work moving image displayed on the display screen.

5. A work analysis method executed by a mobile computer including an image-capturing unit configured to capture an image of a work and record a work moving image that is a moving image of the work, the mobile computer being configured to record the work moving image and perform work analysis based on the work moving image, and being portable during a work that includes a plurality of work processes in order to capture an image of a work of each of the work processes, the work analysis method comprising:
receive input of a user operation and set a temporal boundary for each work element on the work moving image recorded by the image-capturing unit,
detect recognition information by which the temporal boundary between a work of a first work process and a work of a second work process that is subsequent to the first work process in the work is recognized, the recognition information being provided on a work place of each work process,
when the recognition information is detected, set the temporal boundary on the work moving image between work elements that are the work of the first work process and the work of the second work process, based on the recognition information,
designate a type including at least one of a valid operation indicating that a valid operation has been performed in the work and an invalid operation indicating that an invalid operation has been performed in the work relative to each of the work elements defined by setting the boundary,
calculate a work time of the work of the work process and/or the work element based on the work moving image on which the boundary is set;
acquire attribute information of a worker of the work of the work process and/or the work element based on the work moving image on which the boundary is set;
store work-related data in which at least the work moving image of the work and/or the work element, the work time, the attribute information of the worker, and the recognition information detected by the boundary detection unit are associated with each other for each work of the work process and/or each work element; and
store the work element for which the type is designated.

6. A mobile work analysis device comprising:
an image-capturing unit configured to capture an image of a work and record a work moving image that is a moving image of the work,
wherein the mobile work analysis device is configured to record the work moving image and perform work analysis based on the work moving image, and
during a work that includes a plurality of work processes, the mobile work analysis device is portable in order to capture an image of a work of each of the work processes, the mobile work analysis device further comprising:
at least one processor configured to
receive input of a user operation and set a boundary for each work element on the work moving image recorded by the image-capturing unit;
detect recognition information by which a boundary between a work of a first work process and a work of a second work process that is subsequent to the first work process in the work is recognized;
when the recognition information is detected, set the boundary on the work moving image between work elements that are the work of the first work process and the work of the second work process, based on the recognition information;
designate a type including at least one of a valid operation indicating that a valid operation has been performed in the work and an invalid operation indicating that an invalid operation has been performed in the work for each of the work elements defined by setting the boundary by the first boundary setting unit and the second boundary setting unit;
calculate a work time of the work of the work process and/or the work element based on the work moving image on which the boundary is set;
acquire attribute information of a worker of the work of the work process and/or the work element based on the work moving image on which the boundary is set; and
store work-related data in which at least the work moving image of the work and/or the work element, the work time, the attribute information of the worker, and the recognition information detected by the boundary detection unit are associated with each other for each work of the work process and/or each work element; and
a storage unit configured to store the work element for which the type is designated by the type designation unit.

7. The mobile work analysis device according to claim 6, further comprising:
a communication unit configured to perform data communication with an outside via a network, transmit the work-related data to an external analysis device that performs work analysis, and receive analysis data based on the work-related data from the external analysis device; and
an analysis data output unit configured to output the analysis data.

* * * * *